United States Patent [19]
Holdsworth et al.

[11] Patent Number: 6,076,949
[45] Date of Patent: Jun. 20, 2000

[54] MOTOR VEHICLE AND A WHEEL CARRIER THEREFOR

[75] Inventors: Trevor Charles Holdsworth, Solihull; Gary Underwood, Bicester; Simon Andrew Whorlow, Kenilworth, all of United Kingdom

[73] Assignee: Rover Group Limited, Warwick, United Kingdom

[21] Appl. No.: 09/041,498

[22] Filed: Mar. 12, 1998

[30] Foreign Application Priority Data

Mar. 14, 1997 [GB] United Kingdom .................... 9705355

[51] Int. Cl.$^7$ .................................................. B62D 43/02
[52] U.S. Cl. .......................... 362/500; 362/496; 362/540; 362/541; 362/505; D12/202
[58] Field of Search ..................... 362/500, 496, 362/540, 541, 505, 320, 42

[56] References Cited

U.S. PATENT DOCUMENTS 5,050,051  9/1991  Machida et al. ..................... 362/80.1
5,076,629  12/1991  Peters et al. .............................. 296/42

*Primary Examiner*—Sandra O'Shea
*Assistant Examiner*—Bertrand Zeade
*Attorney, Agent, or Firm*—Davis and Bujold

[57] ABSTRACT

A wheel carrier 10 for a spare wheel 56 is mounted on the rear door 50 of a motor vehicle. The carrier includes an upwardly extending arm having a stop lamp 14 mounted on its free end. The arm 18 is offset from the rear door 50 so that a wiper arm 54a can pass between the arm 18 and a rear window 52 of the motor vehicle.

12 Claims, 5 Drawing Sheets

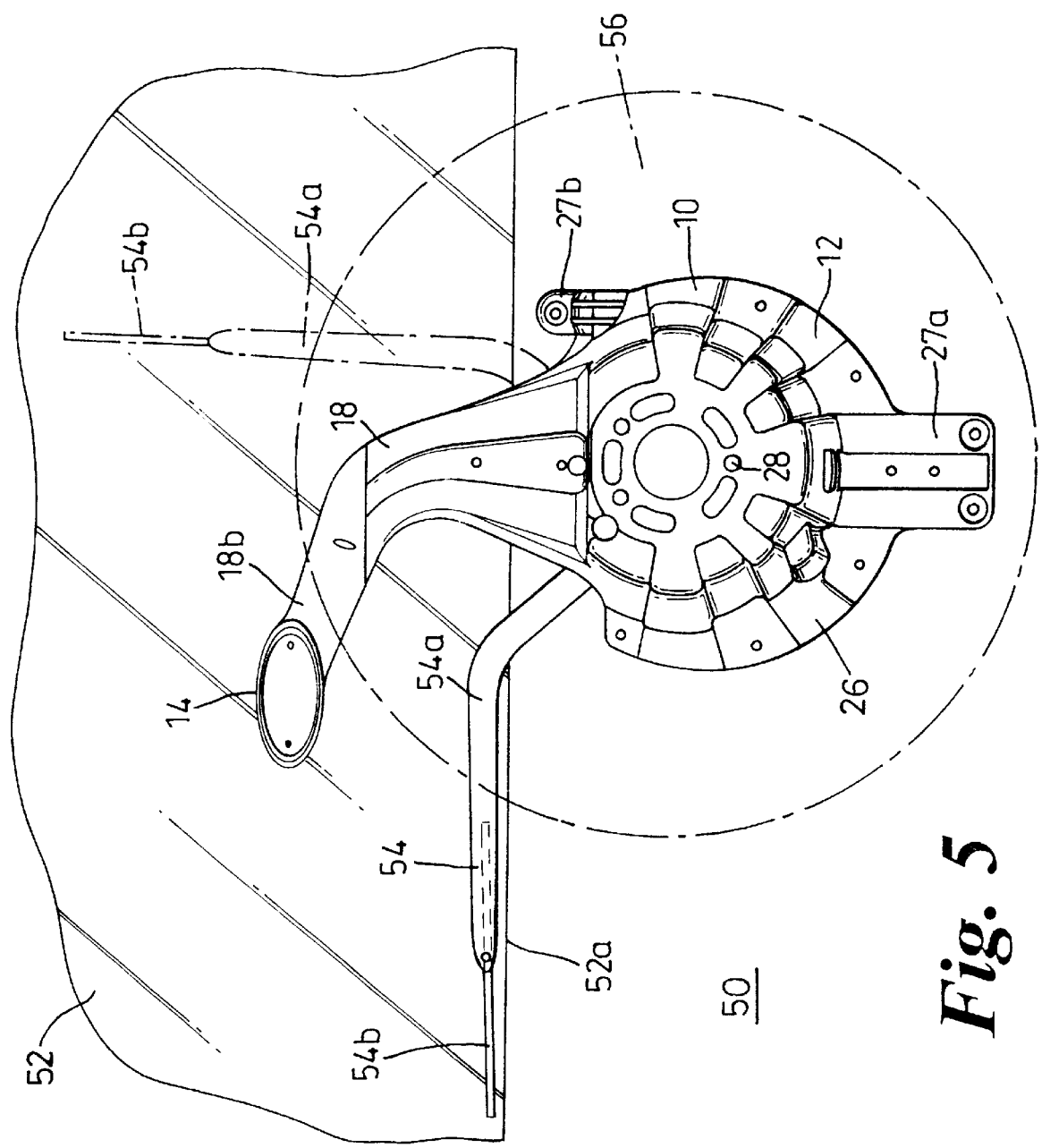

MOTOR VEHICLE AND A WHEEL CARRIER THEREFOR

BACKGROUND OF THE INVENTION

This invention relates to a wheel carrier for a motor vehicle and, in particular, to a wheel carrier for mounting a spare wheel on the rear door panel of a motor vehicle.

It is well known to provide a carrier for mounting a spare wheel on the rear door of a motor vehicle comprising of a support means for supporting the spare wheel, a means for attaching the support means to the motor vehicle and a further means for attaching the spare wheel to the support means.

It is further known to provide a stop lamp or similar indicator mounted in a high position on the rear of a motor vehicle to indicate the application of the brakes of the motor vehicle.

SUMMARY OF THE INVENTION

It is an object of this invention to provide an improved wheel carrier for a motor vehicle.

According to a first aspect of the invention, there is provided a wheel carrier for a motor vehicle, the carrier comprising a) a support means, for supporting a wheel, having a first attaching means for attaching the support means to the vehicle, at least one second attaching means for attaching a wheel to be supported by the support means to the support means and b) a rear stop lamp mounted on a support arm connected to the support means such that, in use, the rear stop lamp protrudes from behind a wheel when attached to the wheel carrier.

According to a second aspect of the invention, there is provided a motor vehicle having a body structure including a rear door and a spare wheel carrier mounted on the rear door wherein the spare wheel carrier comprises a) a support means, for supporting a wheel, having a first attaching means for attaching the support means to the vehicle, at least one second attaching means for attaching the wheel to the support means and, b) a rear stop lamp mounted on the support arm connected to the support means such that the rear stop lamp protrudes from behind a wheel when attached to the carrier.

BRIEF DESCRIPTION OF THE DRAWINGS

The invention will now be described, by way of example, with reference to the accompanying drawings in which:

FIG. 5 is a view similar to that of FIG. 2 but showing only part of the rear of the motor vehicle.

DETAILED EXEMPLARY DESCRIPTION

Figure 1:
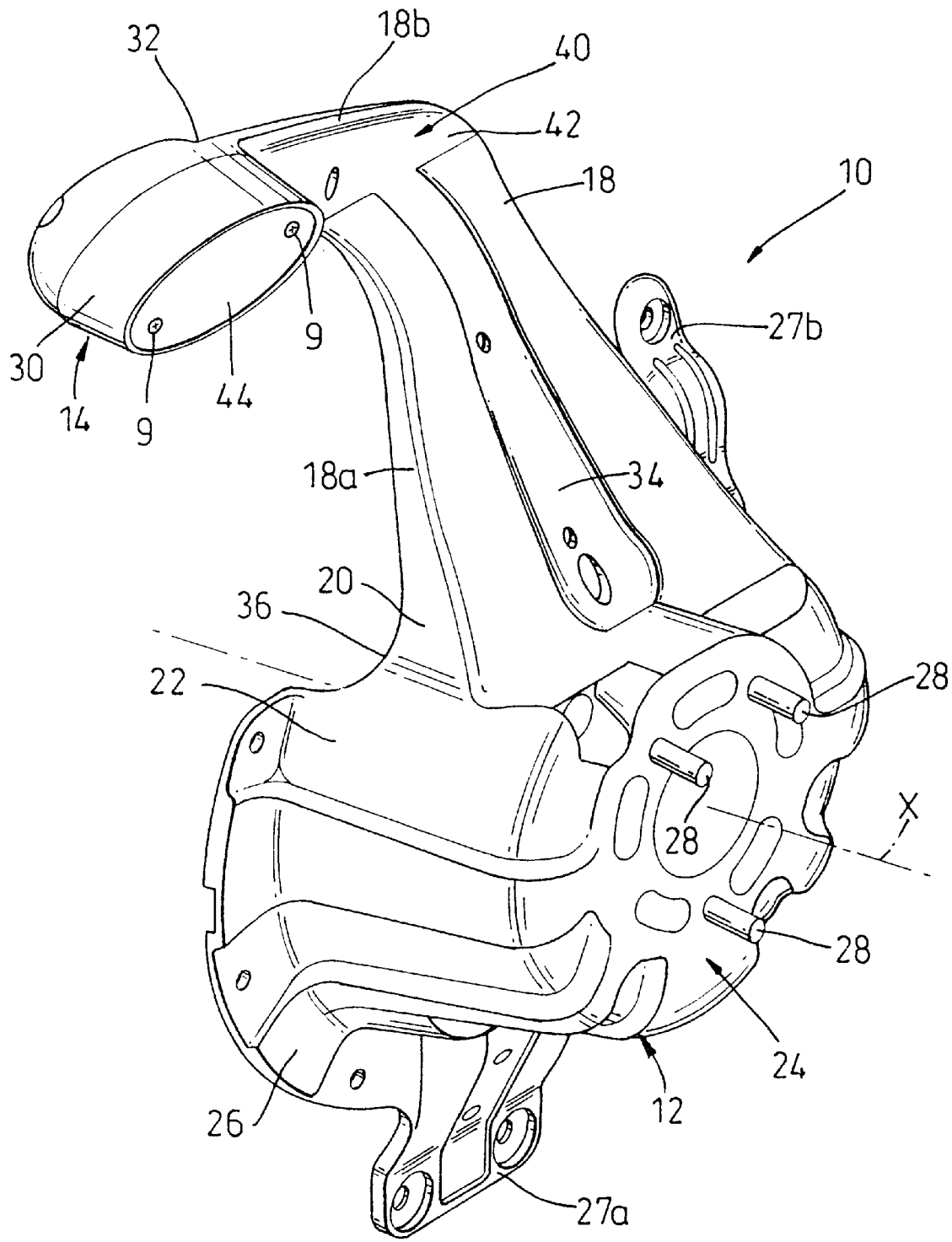
FIG. 1 is a perspective view of a wheel carrier according to a first aspect of the invention.

With reference to the figures, there is shown a wheel carrier 10 comprising of a wheel support means 12, and a stop lamp 14 mounted at the end of a support arm 18. The support arm 18 has a base 20 attached to the support means 12 and is formed as an integral part of the wheel support means 12 as a one-piece part.

The wheel support means is bucket-shaped and comprises of a slightly tapered cylindrical body portion 22 defining a central longitudinal axis X of the carrier 10. The body portion 22 terminates at its narrower end in a substantially flat disc-shaped end wall 24 and at its other wider end in an outwardly extending flange 26 which forms a substantially flat base for the wheel carrier 10.

A first attaching means is provided for attaching the support means 12 to a rear door 50 of a motor vehicle 5. The first attaching means being formed by a first mounting bracket 27a which extends radially from the outer edge of the flange 26 at the lower side of the support means 12 and a second mounting bracket 27b which extends upwardly from the flange 26 near to the juncture of the base 20 of the supporting arm 18 with the support means 12.

A second attaching means for attaching a wheel to the support means 12 is formed by three threaded studs 28 that protrude from the end wall 24 of the support means 12. The studs 28 are circumferentially spaced apart such that they are all positioned equidistant from the central longitudinal axis X. In this way, a wheel 56 attached to the carrier 10 has its axis of rotation positioned coincident with the central longitudinal axis of the carrier 10.

The supporting arm 18 has a lower portion 18a the base portion 20 of which is attached to the body portion 22 about half way between the flange 26 and the end wall 24 and an upper portion 18b.

The lower portion 18a of the support arm 18 extends vertically upwardly from the upper side of the body portion 22 whereas an upper portion 18b of the support arm 18 extends diagonally upwardly and horizontally from the upper end of the lower portion 18a. A free end of the upper portion 18b has a housing 32 for the stop lamp 14 formed in it. A channel 34 extends up the center of the support arm 18 to both strengthen the support arm 18 and also to carry electrical wiring (not shown) for the stop lamp 14.

Behind the support arm 18, the body portion 22 is cut away to produce an opening 36 between the body portion 22 and the door 50 of the motor vehicle 5.

The wheel support portion 12, the support 18 and the stop lamp housing 32 are formed as a single high pressure aluminum casting.

A second casting 40 forms a front stop lamp housing 30 and a front cover 42 for the upper portion 18b of the support arm 18. A plastic lens 44 for the stop lamp 14 is attached to the front stop lamp housing 30 by means of two screws 9.

Figure 2:
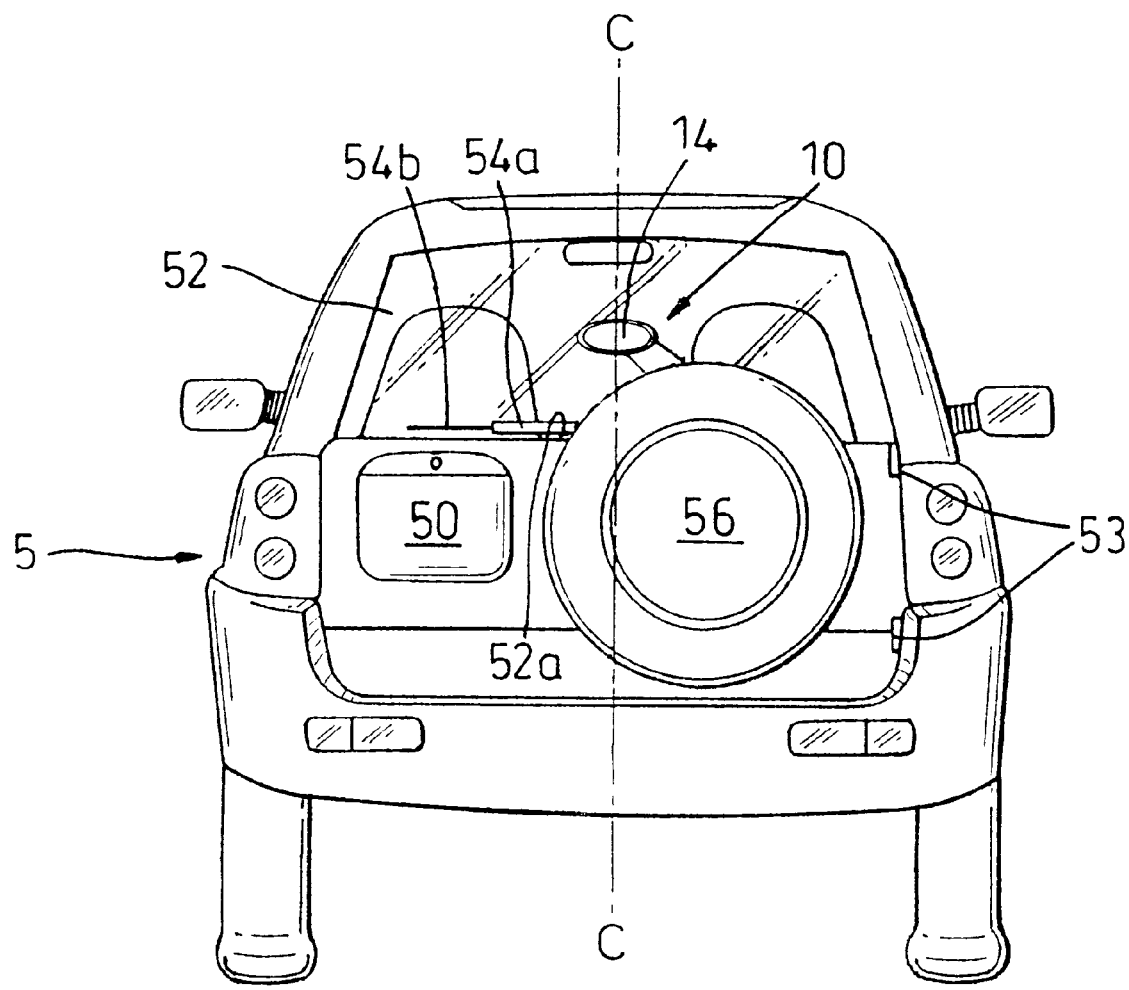
FIG. 2 is a view of the rear of a motor vehicle having a wheel carrier according to the first aspect of the invention mounted thereupon.

With particular reference to FIGS. 2 and 5, the rear door 50 of the motor vehicle 5 has a rear window 52 mounted therein. The wheel carrier 10 is mounted on a panel of the rear door 50 beneath the rear window 52. The door 50 is attached to the rest of the body of the motor vehicle by means of two hinges 53 on the right hand side of the rear door 50. As can best be seen with reference to FIG. 2 a wheel 56 is mounted on the rear door such that it is offset from a central axis C—C of the motor vehicle towards the right hand side of the motor vehicle so as to minimize the loading on the hinges 53.

The carrier is attached to the door 50 by means of the mounting brackets 27a, 27b and the flange 26 rests against the panel of the door 50.

The stop lamp support arm 18 extends both upwardly and horizontally across the door 50 and the rear window 52 so that the stop lamp protrudes from behind the wheel 56 supported by the carrier 10 and is positioned approximately on the central axis C—C of the motor vehicle about one third of the way up from a lower edge 52a of the rear window 52. The support arm 18 and the stop lamp 14 are both spaced away from the rear window 52 and the door 50.

A rear window wiper 54 comprises of a wiper arm 54a and a wiper blade 54b. The wiper arm 54a is attached at one end to the rear door 50 at a position behind the support means 12 by means of a rotatable mounting. The wiper arm 54a is reciprocally moveable by means of an electric motor (not shown) between a substantially horizontal parked position in which the wiper blade 54b lies along the lower edge 52a of the screen 52 to an upright position in which the wiper blade 54b extends substantially vertically up the rear window 52 (as shown by reference numerals 54a, 54b on FIG. 5).

The wiper arm 54a protrudes from behind the carrier 10 through the aperture 36 in the support means 12 between the carrier 10 and the door 50. The aperture 36 is located behind the base 20 of the stop lamp support arm 18 and extends over a sufficiently large part of the circumference of the support means 12 to accommodate the full travel of the wiper arm 54a. In use, the wiper arm 54a passes between the support arm 18 and the rear window 52 as it moves between its parked and upright positions.

The spare wheel 56 is mounted on the studs 28 and is secured in position by means of nuts (not shown) which are threaded onto the studs 28. When the wheel 56 is attached to the carrier 10, the axis of rotation of the wheel 56 coincides with the central longitudinal axis X of the carrier 10.

The radius of the wheel 56 is larger than the radius of the flange 26 and is also larger than the distance from the longitudinal axis X of the carrier to the ends of the brackets 27a, 27b. This ensures that all of the wheel supporting parts of the carrier 10 are hidden behind the spare wheel 56 when the spare wheel is in place on the door 50.

The lower portion 18a of the support arm 18 is also hidden behind the spare wheel 56. However, the free end of the support arm 18 in which is mounted the stop lamp 14 is at a greater distance from the longitudinal axis X than the radius of the wheel 56. The stop lamp is, therefore, visible protruding out from behind the spare wheel 56 when the motor vehicle 5 is viewed from behind. As is well known, the stop lamp 14 is electrically connected to part of the vehicle braking system such that when the brakes of the motor vehicle are actuated the stop lamp will be illuminated. The stop lamp 14 has an electric light bulb (not shown) mounted in the housing 13 and electrical wiring is rooted up the channel 34 in the support arm 18.

Figure 3:
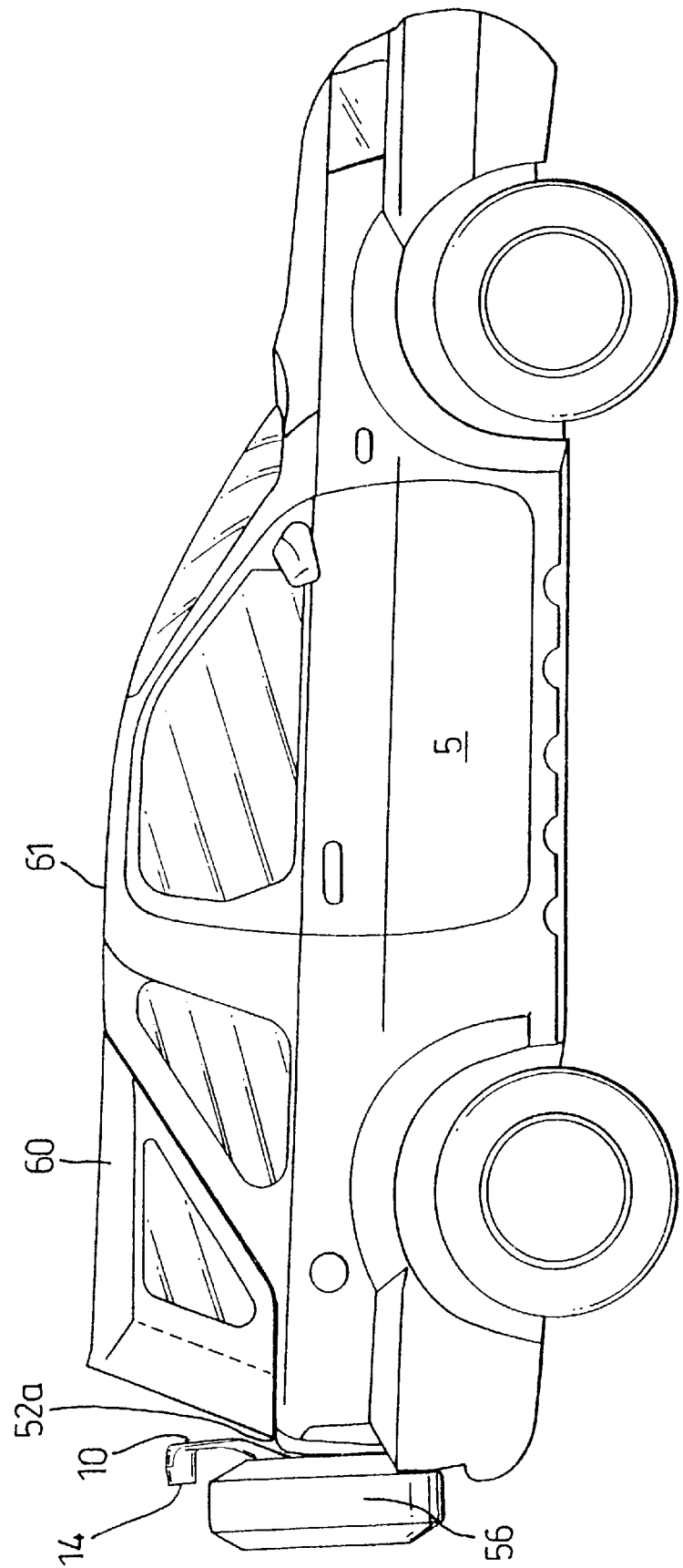
FIG. 3 is a side view of the motor vehicle shown in FIG. 2 showing a foldable rear roof section of the motor vehicle in a first erect position.
Figure 4:
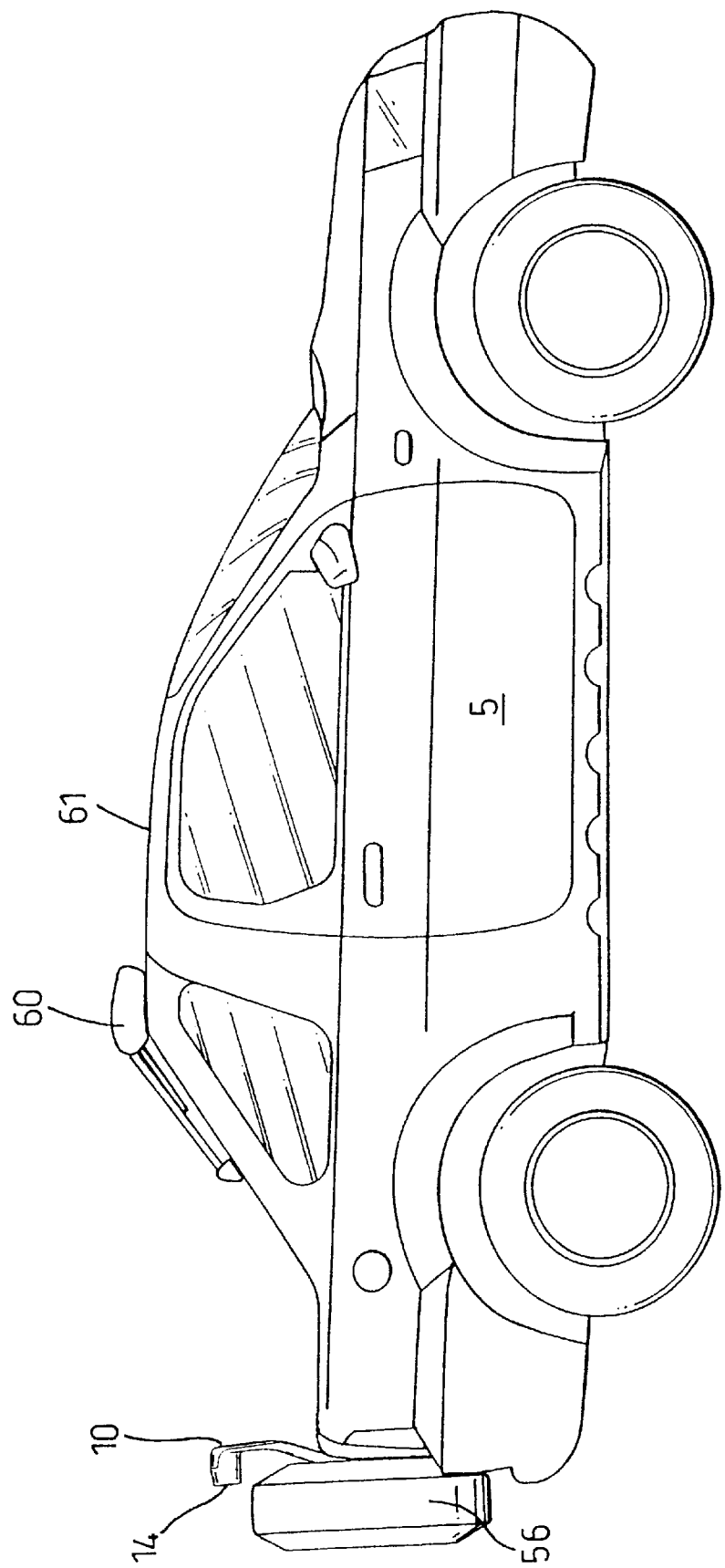
FIG. 4 is a side view similar to that shown in FIG. 3 in which the rear roof section of the motor vehicle is folded into a second position.

With particular reference to FIGS. 3 and 4, it can be seen that the motor vehicle 5 has a foldable rear roof section 60 and a rigid front roof portion 61.

When in a first or erect position (as shown in FIG. 3), the rear roof section 60 encloses a rear compartment of the motor vehicle 5. In this position, the rear window is in an upmost position such that it forms a seal with the rear roof section 60 thereby forming an enclosed compartment within the motor vehicle 5.

In a second position, the rear roof section 60 is folded forward and secured near to a rear edge of the front rigid roof portion 61. In this position, the rear window 52 is retracted into the rear door 50 so that the rear portion of the motor vehicle 5 is open and exposed to the surrounding environment. However, even when the rear window 52 is retracted and the rear roof section 60 is folded the rear stop lamp 14 remains visible and in the same position due to its attachment to the wheel carrier 10.

I claim:

1. A wheel carrier for a motor vehicle, the carrier comprising:
    a) a support means, for supporting a wheel, having a first attaching means for attaching the support means to the vehicle, and having at least one second attaching means for attaching a wheel to be supported motor vehicle
    b) a rear stop lamp mounted on a support arm connected to the support means such that, in use, the rear stop lamp protrudes from behind a wheel when attached to the wheel carrier.

2. A wheel carrier according to claim 1, wherein the support means is bucket-shaped and has a cylindrical body portion defining a longitudinal axis, the body portion terminating at a first end in an outwardly extending flange for abutment, in use, against a body panel of the motor vehicle and at a second end in a disc-shaped end wall.

3. A wheel carrier according to claim 2, wherein the first attaching means comprises at least two brackets attached to the flange.

4. A wheel carrier according to claim 2, wherein the second attaching means comprises a number of threaded fasteners engaged with apertures in the end wall and positioned such that, when a wheel is secured in place, a rotational axis of the wheel is positioned coincident with the longitudinal axis of the support means.

5. A wheel carrier according to claim 1, wherein the support arm is substantially "L"-shaped having a first portion extending upwardly from its position of attachment to the support means and a second portion extending horizontally and upwardly from its juncture with the first portion of the support arm.

6. A wheel carrier according to claim 1, wherein the support arm is formed as an integral part of the support means.

7. A wheel carrier according to claim 2, wherein the flange and the body portion are cut away in the region of the support arm to define an opening behind the support arm through which, in use, a wiper arm of the motor vehicle can extend.

8. A motor vehicle having a body structure including a rear door and a spare wheel carrier mounted on the rear door wherein the spare wheel carrier comprises:
    a) a support means, for supporting a wheel, having a first attaching means for attaching the support means to the vehicle, and having at least one second attaching means for attaching the wheel to the support means; and
    b) a rear stop lamp mounted on a support arm connected to the support means such that the rear stop lamp protrudes from behind a wheel when attached to the spare wheel carrier.

9. A vehicle according to claim 8, wherein the support means is bucket-shaped and has a cylindrical body portion defining a longitudinal axis, the body portion terminating at a first end in an outwardly extending flange for abutment against a body panel forming the rear door of the motor vehicle and at a second end in a disc-shaped end wall, the stop lamp being positioned further from said longitudinal axis than any part of a wheel supported by a carrier.

10. A vehicle according to claim 8, wherein the support arm is formed as an integral part of the support means as a one-piece component.

11. A vehicle according to claim 8, wherein the vehicle further comprises a rear window and a window wiper therefore, the window wiper including a wiper arm that extends outwardly from a position of rotation located on the rear door behind the support means, the support arm being positioned such that the support arm spaced away from the rear window to allow the wiper arm to pass between the support arm and the rear window.

12. A vehicle according to claim 8, wherein the carrier is mounted on the rear door in a position that is offset from a center position of the rear of the vehicle and the support arm extends upwardly towards the center position of the vehicle so as to position the stop lamp substantially centrally with respect to the rear door of the motor vehicle.

* * * * *